(12) United States Patent
Alles et al.

(10) Patent No.: US 6,769,025 B1
(45) Date of Patent: *Jul. 27, 2004

(54) FLEXIBLE EXTERNAL CONTROL OF UNSOLICITED WEB PAGES SENT TO A USER ACCESSING THE INTERNET

(75) Inventors: Anthony L. Alles, Sunnyvale, CA (US); Gil Tene, San Carlos, CA (US); Shyam Prasad Pillalamarri, Palo Alto, CA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,060

(22) Filed: Mar. 16, 2000

(51) Int. Cl.[7] .............................................. G06F 15/173
(52) U.S. Cl. ....................... 709/225; 709/229; 709/230
(58) Field of Search ................................ 709/217, 219, 709/225, 229, 203, 230

(56) References Cited

U.S. PATENT DOCUMENTS 6,219,042 B1 * 4/2001 Anderson et al. ........... 345/716
6,397,246 B1 * 5/2002 Wolfe .......................... 709/217
6,430,739 B1 * 8/2002 Ballard ........................ 717/172
6,438,125 B1 * 8/2002 Brothers ...................... 709/219

FOREIGN PATENT DOCUMENTS

WO    WO 98/41913    * 9/1998

OTHER PUBLICATIONS

HTML 4.0 Specification, Apr. 1998, World Wide Web Consortium, section 7.*

* cited by examiner

Primary Examiner—Zarni Maung
(74) Attorney, Agent, or Firm—Blakely Sokoloff Taylor & Zafman LLP

(57) ABSTRACT

An internet service node (ISN) for sending unsolicited web pages only to users agreeing to receive unsolicited web page. An internet service provider (ISP) may charge lower rates to users agreeing to receive unsolicited web pages. For example, an ISP may send an unsolicited web page in response to the first web page request for a user. In general, a user may agree to receive different types of unsolicited web pages under different conditions. An ISN may monitor the data flows related to the user to determine whether any condition is satisfied; and a web server may be used to generate and send the corresponding unsolicited web page.

17 Claims, 4 Drawing Sheets

FLEXIBLE EXTERNAL CONTROL OF UNSOLICITED WEB PAGES SENT TO A USER ACCESSING THE INTERNET

RELATED APPLICATIONS

The present application is related to the following United States Patent Applications), which are both incorporated in their entirety herewith:

(1) Entitled, "A System and Method for Providing Desired Service Policies to Subscribers Accessing the Internet", Ser. No. 09/205,041, filed on Dec. 3, 1998 now U.S. Pat. No. 6,446,976 (hereafter "RELATED APPLICATION 1"); and (2) Entitled, "Assigning Cell Data to One of Several Processors Provided in a Data Switch", Ser. No. 09/260,785; Filing Date: Mar. 2, 1999 now U.S. Pat No. 6,633,563 (hereafter "RELATED APPLICATION 2").

BACKGROUND OF THE INVENTION

1. Field of the Invention

The present invention relates generally to digital communication networks, and more specifically to a system and method for flexibly controlling any unsolicited web pages sent to a user accessing the Internet.

2. Related Art

Users often access the Internet using a user system. A computer system with a modem is a typical example of a user system. However, user systems can include any other devices such as television systems and hand-held portable devices (e.g., Palm-Pilot from 3Com Corporation) which enable a user to access the Internet, As is well known, Internet refers to a conglomeration of interconnected systems. The systems on the Internet will also be referred to as remote systems in the present application.

Users have the ability to access different information and services provided on remote systems. The access is enabled typically in the form of web pages. A web page generally contains a combination of multi-media components such as text, graphics, voice, and video. A web page is typically identified by a Universal Resource Locator (URL), and the URL is typically used by user to access the web page. For ease of navigation, many web pages contain hyper-links having associated URLs, and a user typically actuates (for example by clicking) a hyperlink to access the web page identified by the corresponding URL.

In the conventional general approach described above, software ("client software") such as browsers (available from companies such as Netscape and Microsoft) typically control the specific web page accessed by a user. The user, in turn, generally specifies the page of interest typically by a suitable user interface. Web servers on the Internet provide the specified page to the client software, and the client software generally displays the provided web page.

However, it may be desirable to send a different web page ("unsolicited page") than that requested by a client software. The unsolicited web page contains content different from that of the one that has been requested. For example, the first web page (typically referred to as "home page") provided to a user is gaining increasing importance. As an illustration, "network portals" provided by companies ("portal companies") such as Yahoo and Netscape are attempting to become Internet entry points for users. It is generally believed that a portal company will be able to generate substantial revenues should the users use a web page provided by a portal company as the first page when accessing the Internet.

At least the portal companies would wish to have their web pages be the first pages even if not requested by a user.

Sending unsolicited pages may be desirable in several other situations as well. For example, a service provider may wish to send different web pages containing advertisements when the requested page cannot be retrieved due to network congestion. As is well known in the relevant arts, the advertizing parties often pay for such advertisements.

However, sending unsolicited pages (either as the first page or later for advertisements) may be undesirable in some situations. For example, some users may wish to retain control of all the web pages they receive. Some users may further wish to have such control in some times and willing to relinquish control some other times.

Accordingly, what is needed is a method and apparatus for flexibly controlling any unsolicited web pages sent to a user system accessing the Internet.

SUMMARY OF THE INVENTION

The present invention enables unsolicited web pages to be sent to a user according to various services subscribed by the user. As a result, a user may receive unsolicited pages under some circumstances (e.g., non-business hours) or not receive unsolicited pages at all.

An access network in accordance with the present invention may be configured to indicate which users may wish to receive unsolicited web pages and under what conditions. If a condition is satisfied, the corresponding web page may be sent as an unsolicited page.

In an embodiment, an internet service node (ISN) is provided as an Internet edge device (preferably combined as an IP router), and the ISN is configured with the user specific information. The ISN may monitor data flows to and/or from the user system and determine whether a condition has been satisfied. Typically, conditions are based on reception of web page access requests.

If a condition is satisfied, ISN may forward the corresponding web page access request to a web server. The web server may form an unsolicited page (preferably to correspond to the satisfied condition) and send the unsolicited page to the user system. The unsolicited page is a page different from the page specified in the web page access request. The different web page may have different internal layout (frame structure) than that requested.

In an embodiment, the first web page provided to a user accessing the Internet may be controlled. When a first request for a web page in a web access session is received, the ISN may operate in conjunction with the web server to provide an unsolicited page instead of the web page specified in the first request. The unsolicited web page may correspond to a web page provided by a portal company.

Additional web pages may also be provided in accordance with the present invention. In response to a web page access request, an unsolicited web page having an URL specified by the web page access request and a suitable associated refresh period may be sent. The refresh period causes typical client software (web browsers) to request the page with the URL again. When the request is received as a result, ISN may forward the request packet to the specified IP destination address. Accordingly, the user receives the requested web page automatically on the second attempt.

The present invention provides a non-intrusive mechanism for sending unsolicited web pages to users as the web pages are sent only users willing to receive the unsolicited web pages.

The present invention is particularly suited for access providers such as ISPs and LECs as the providers may selectively send web pages with advertisements or related to portal companies to users accessing Internet, and charge the beneficiaries (advertised companies, portal companies) for forcing the users to view the information in the web pages.

The present invention provides a convenient method of controlling the home page of a user as the access provider may selectively send any web page in response to a requested web page.

The present invention provides a non-intrusive mechanism of sending web page with advertisements as the web page requested by the user will be automatically received by the user due to the URL specified for the unsolicited web page and the refresh period.

The present invention enables a single ISN to be used to serve users agreeing to receive unsolicited web pages and users not agreeing to receive unsolicited web pages as the unsolicited web pages may be sent only according to subscribed services.

The present invention is particularly useful for internet service providers (ISP) as the ISPs can send advertisements to users on a subscription basis and charge less the clients who are willing to receive advertisements.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
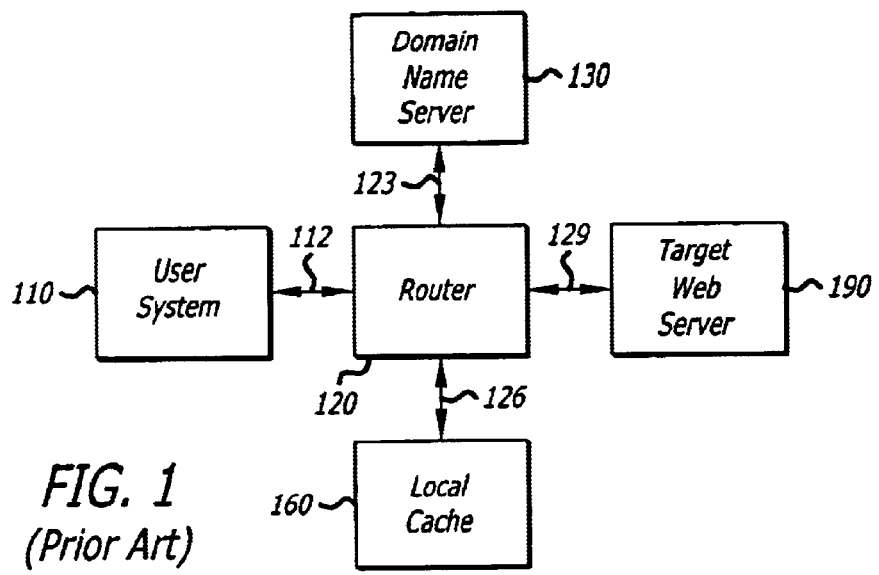
FIG. 1 is a block diagram illustrating a conventional way of accessing desired web pages available on the Internet.

1. Overview and Discussion of the Present Invention

The present invention enables flexible external control of unsolicited web pages sent to the user. Unsolicited web pages refer to web pages not specifically requested by the client software used by a user. Unsolicited web pages may be sent either as a 'substitute' for a user requested page or 'voluntarily'.

In the case of substitution, one web page may be specified in a web access (e.g., HTTP request) request and a different web page may be sent in response. In the case of sending voluntarily, unsolicited web pages may be sent in addition to any user-requested web pages or substituted pages. In addition, a web page may be sent without user specifying a web page as soon as the user logs on to a service provider network.

However, the present invention enables unsolicited pages to be sent based on services selected by a user, and thus users may decide not to receive any unsolicited pages. The present invention can be appreciated well by an understanding of how web pages are accessed in a typical environment. Accordingly, the manner in which desired web pages are accessed is described first.

2. Solicited Pages

The manner in which a user may request desired web pages ("solicited web pages") and the manner in which access of the solicited web pages may be enabled in a typical environment is illustrated with reference to FIG. 1. Links 112, 123, 126 and 129 represent logical connections between the respective systems at either ends. In reality, each of these links may contain several networks or a single physical interface as is well known in the relevant arts.

A user generally uses client software (e.g., web browser) on user system 110 to access various web pages. The client software generally provides a user interface to enable a user to specify a web page. The pages so specified may be referred to as "solicited pages."

A web page is generally specified by an universal address locator (URL). An example of a URL is "http://www.samachar.com/top25/index.html." Of this URL, HTTP stands for hyper-text transfer protocol, and is generally the protocol used for web browsing. "www.samachar.com" is the internet domain name of target web server 190 where the web page may be expected to be available from. The remaining portion of the URL identifies a web page at the target web server 190. In general, a URL uniquely identifies a web page along with the server at a internet domain name on which the web page resides.

The internet domain address needs to be first translated into an IP address before user system 110 may communicate with target web server 190 and retrieve the desired web page. If the IP address is not available within an internal IP address cache, user system 110 may send an DNS request packet to domain name server (DNS) 130 requesting the IP address corresponding to the internet domain address of target web server 190. In response, DNS 130 may send the IP address of the specified internet domain address. The DNS transactions are well-understood in the relevant arts.

Once the IP address of target web server 190 is determined, user system 110 sends a web page access request with the IP address of target web server 190. The web access request IP packet generally uses TCP port number 250 and includes the URL of the desired page. Router 120 usually forwards the web access request IP packet to target web server 190, which sends the requested web page to user system 110 in a known way.

In an improvement known in the art, router 120 may cache frequently accessed web pages in local cache 160, and use the cached web pages to serve user requests. Such caching enables unneeded traffic to be avoided on network link 129, and the users may be provided the required pages quickly.

However, the system of FIG. 1 may not enable the provision of 'unsolicited pages' because only the web pages requested by the users are provided. In addition, all users may be treated similarly in the environment of FIG. 1. In contrast, the present invention enables unsolicited web pages to be provided only to users agreeing to receive them.

Figure 2:
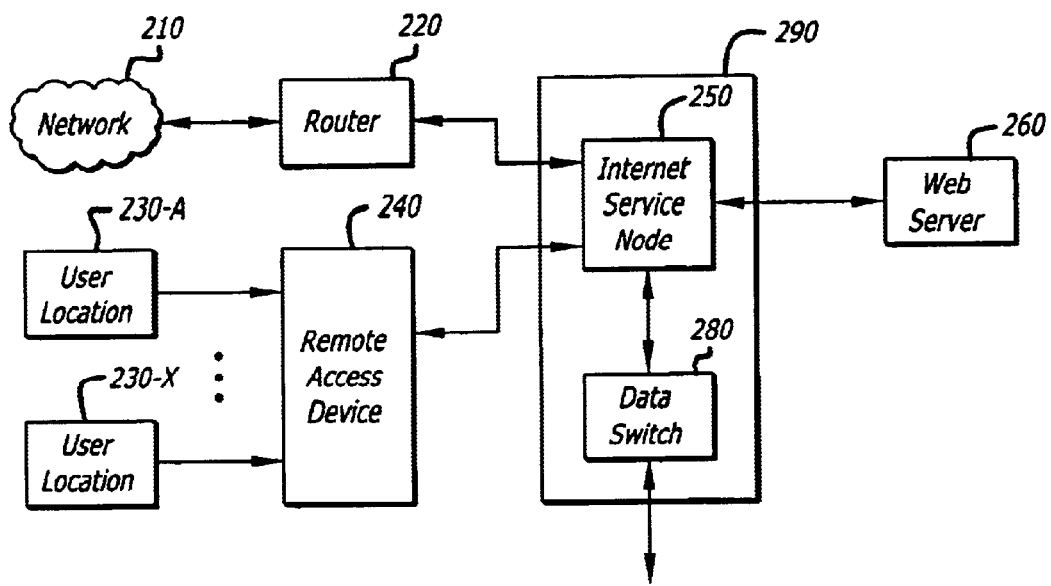
FIG. 2 is a block diagram of a telecommunication system illustrating an example environment in which the present invention can be implemented.

The present invention has particular application for internet service providers (ISPs) and local exchange carriers (LECs) who serve multiple users. The ISPs and LECs are examples of service providers. An ISP may determine which users and under what conditions (e.g., business hours) would they be willing to accept unsolicited pages and send unsolicited pages as determined by the ISP. In return for accepting unsolicited pages, an ISP may charge lower rates for a user. The beneficiaries of the unsolicited pages may be charged for the service. FIG. 2 illustrates an example environment useful for ISPs.

2. Example Environment

FIG. 2 is a block diagram illustrating an example telecommunication environment 200 in which the present invention can be implemented. The Figure depicts different user locations (110, 230-A and 230-X) interfacing with internet service node (ISN) 250 using different access technologies. As described below, ISN 250 enables different unsolicited web pages to be provided only to desired users (not necessarily all) according to the subscribed services.

User network 210 may contain several systems connecting to router 220. User network 210 may be viewed as containing one or more users. Router 220 may transfer data to ISN 250 as IP packets using protocols such as serial line interface protocols (SLIP). User location 230-A and user location 230-X are shown connected to remote access device 240, which may correspond to a modem or DSLAM implemented in a known way. Remote access device 240 may transfer data as IP packets segmented into ATM cells. Even though not shown, remote access device 240 may also be considered part of access network 290. Each location 230 may contain a single or multiple users.

It should be understood that the interfaces and user locations of FIG. 2 are merely examples. ISN 250 may interface with different user locations using different media and technologies without departing from the scope and spirit of the present invention as will be apparent to one skilled in the relevant arts. Such other implementations are contemplated to be within the scope and spirit of the present invention. Similarly, ISN 250 may interface directly with the Internet instead of relying on data switch 280.

Web server 260 generates any unsolicited web pages as required for a specific user. The content of an unsolicited page may be different for each user and for different conditions. As an illustration, each unsolicited web page may be generated according to a user profile. A user profile generally indicates the types of information a user is interested in. If a user profile indicates an interest in golf, golf related advertisements may be included in the unsolicited page. The contents of an unsolicited web page can be different at different times of the day.

In general, an unsolicited web page can be constructed dynamically (preferably beforehand except for real-time information) depending on a user profile. The information in a web page may contain information from several sources on the world-wide web. The implementation of web server 260 will be apparent to one skilled in the relevant arts.

ISN 250 and web server 260 together operate to send unsolicited pages to users according to subscribed services. In general, the functions of ISN 250 and web server 260 can be varied between the two systems depending upon available technologies and other design considerations. In an embodiment, ISN 250 determines whether to send unsolicited web pages based on subscribed services. When ISN 250 decides to send an unsolicited page, ISN 250 sends data to web server 260 requesting appropriate action. In turn, web server 260 generates unsolicited web pages and sends them to the user system.

To ensure that unsolicited web pages are provided to users only as permitted according to the subscribed services, ISN 250 may need to examine the data sent to and/or received by user systems. The manner in which ISN 250 can be implemented is described in further detail below.

3. Method of Providing Unsolicited Web Pages Only As Desired by Subscribers

Figure 3:
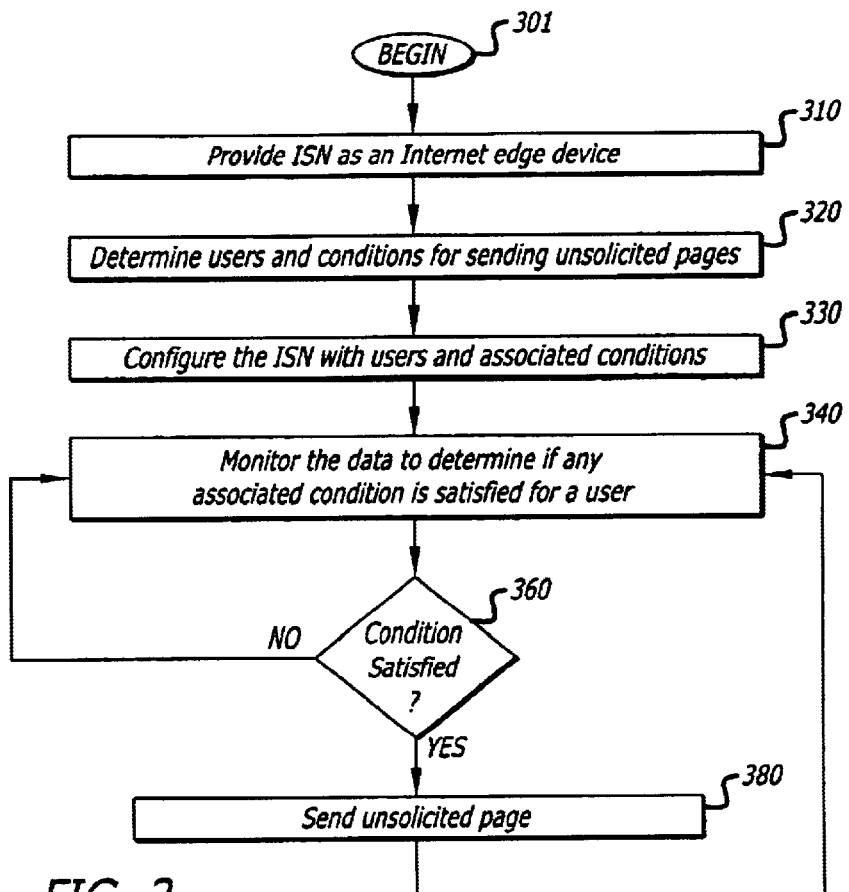
FIG. 3 is a flow-chart illustrating a method for sending unsolicited pages in accordance with the present invention.

FIG. 3 is a flow chart illustrating the manner in which ISN 250 enables an ISP (or LEC) to flexibly provide different unsolicited web pages in accordance with the present invention. In step 310, an ISP may provide ISN 250 as a device in the path of user connections. ISN 250 is preferably provided as an edge device which can examine the data from/to user systems to determine whether an unsolicited page can be sent. To minimize the number of components in a remote access network, ISN 250 may be implemented as an IP router also.

In step 320, users and conditions for sending unsolicited pages may be determined. Typically, a determination is made as to under what conditions a user is willing to accept a specific type of unsolicited pages. For example, some users may wish to receive an unsolicited page as a first page of a session (explained below in further detail) during non-business hours, and some other users may agree to receiving unsolicited pages periodically. Some users may not wish to receive any unsolicited pages. The information is generally determined based on the various services agreed to or subscribed to by the users.

In step 330, one or both of ISN 250 and web server 260 (or access network 290, in general) may be configured to specify users and associated conditions under which different types of unsolicited web pages may be sent. For some users, unsolicited web pages may never be sent. In such a case (or when conditions are not satisfied), ISN 250 may serve as a simple forwarding device (e.g., IP router) for data received from and sent to the users.

Any configuration scheme can be employed to provide the information necessary for identifying the user-condition and web page combinations. For example, a service provider may configure ISN 250 and web server 260 appropriately. In the alternative, users may be provided access to web server 260 to indicate the desired services, i.e., the conditions under which different unsolicited web pages can be sent.

In step 340, ISN 250 monitors the data from and to user systems at various location to determine if a condition (for a user) configured in step 330 is satisfied. For example, if a user has accepted to receive an unsolicited web page as a first page of a web session, ISN 250 may monitor the data for the beginning of a web session for the corresponding user.

In step 360, so long as no condition is satisfied, the monitoring step of 340 continues. In such a situation, the data is processed in a known way (e.g., as described with reference to FIG. 1) according to the web page requests received from a client software on a user system. If a condition is satisfied for a user, control is passed to step 380.

In step 380, ISN 250 and web server 260 together operate to send an unsolicited page to the user system. An appropriate interface needs to be designed between ISN 250 and web server 260 to send unsolicited web pages consistent with at least client software and subscribed services. Several such interfaces will be apparent to one skilled in the relevant arts, and such interfaces are contemplated to be within the scope and spirit of the present invention.

In an embodiment, ISN 250 examines the data flows related to user applications and makes a determination whether to send an unsolicited page. As noted above, unsolicited pages can be sent as 'substitute' pages or 'voluntary' pages. Sending substitute pages in controlling the first page accessed by a user in a web access session as described below with reference to FIG. 4. Sending voluntary pages in example scenarios is described then.

4. Sending Unsolicited Page As a First Page

In a typical web access session, the first page accessed is commonly referred to as a home page. It may be desirable to send a web page corresponding to a portal company as a home page. Therefore, irrespective of a web page requested by a user system, ISN 250 may send an unsolicited web page corresponding to, for example, a portal company as described in further detail with reference to FIG. 4. In the description below steps 410 and 420 together may correspond to steps 340 and 360 together. Step 450 may correspond to step 380.

In step 410, ISN 250 may determine the beginning of a web access session. The beginning of a web access session is an example of a condition referred to with reference to FIG. 3 above. As will be appreciated, a portal company web page is an example unsolicited page provided to the user upon the satisfaction of this condition.

When a user accesses remote access network 290 by a dial-up connection and IP address is allocated by using a connection path with ISN 290 in the path, ISN 290 may monitor the data on the connection path to determine when the connection is setup. In general, ISN 290 may monitor the communications for IP address allocation or password authentication to determine the beginning of a web access session for dial-up connections.

However, in the case of permanent virtual connections or when ISN 250 does not have visibility into the data flow when a connection is being setup, an ISP may negotiate with a user that a pre-specified idle duration on a user data flow may be viewed as an end of the web access session, and any activity thereafter will be deemed as triggering a beginning of a web access session. It should be noted that ISN 250 generally has visibility into all user data flows as ISN 250 is implemented as an edge device.

In step 420, ISN 250 may monitor the data flows for a user to determine the arrival of a first web page access request. Typically, the reception of HTTP traffic from a user system signals a web page access request. As is well known in the relevant arts, HTTP web access requests are received on port 80 of a TCP connection, and ISN 250 may determine the reception of the first request of a web access session by examining the data with TCP destination port number 250.

In step 430, ISN 250 may operate in conjunction with web server 260 to send an unsolicited (home page) web page instead of the requested first page. In an embodiment, ISN 250 may simply redirect the entire web access request packet to web server 260 (if a condition is satisfied), and web server 260 may generate the web pages which need to be transmitted. However, in this case, ISN 250 may need to notify web server 260 of the condition that has matched if ISN 250 may determine the matching of more than one condition.

For example, a separate communication channel may be implemented between ISN 290 and web server 260. ISN 250 may send additional data on the separate channel along with each web page access request, with the additional data indicating which type of condition has been satisfied. If ISN 250 determines that the web page access request corresponds to a first request in a web access session, a corresponding code may be sent in this separate channel along with the web page access request.

Thus, web server 260 may examine the additional data to determine which condition has been satisfied and generate web pages for sending to the client software. Web server 260 may store a user profile associated with each user and generate web pages based on the user profile when unsolicited pages are being sent.

Web server 260 may provide the generated web pages to the user system. The generated web page may correspond to a page of a portal site and the user may thus be forced to access the page from the portal company as the first page. Thus, the present invention allows for substitution of the home page of a user.

In addition, the present invention may enable the requested page to be automatically resent to the user. In such a case, the home page may be viewed as being sent "voluntarily." Voluntary sending of pages is described below with reference to FIG. 5.

5. Sending Pages Voluntarily

Figure 5:
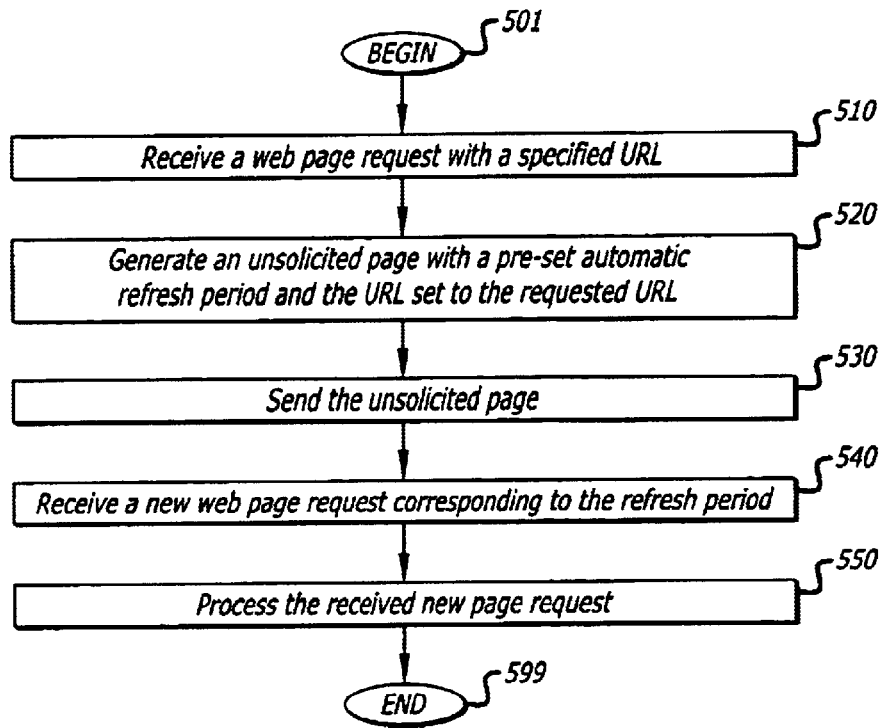
FIG. 5 is a flow-chart illustrating the manner in which web pages can be sent voluntarily to a user system in accordance with the present invention.

FIG. 5 is a flow-chart illustrating the manner in which the present invention enables additional pages to be sent in a non-intrusive manner. Some of the steps of FIG. 5 may be performed to implement step 380 of FIG. 3.

In step 510, ISN 250 may receive a web page request containing a specified URL. The specified web page may be referred to as a 'solicited' web page. In step 520, assuming the user has subscribed to receiving additional web pages (as determined in step 360), ISN 250 along with web server 260 may cause an unsolicited page to be generated.

ISN 250 may determine whether the user has subscribed to the service of receiving additional web pages. If additional web pages can be sent, ISN 250 may forward the received web page access request to web server 260. Web server 260 may generate an unsolicited page with a pre-set automatic refresh period. As is well known in the relevant arts, conventional browsers (client software) request the web page with the same URL after a time duration specified by the automatic refresh period.

Accordingly, web server 260 may construct the unsolicited page to have an URL set to the URL of the solicited web page. Web server 260 may send the unsolicited page to the user system in step 530. Due to the refresh period and the URL set by web server 260, the user system may request the same page (i.e., previously solicited web page) again.

In step 540, ISN 250 may receive the same web access request again. However, the second time, ISN 250 forwards the IP web access request packet to the IP destination address specified in the packet. To ensure that unsolicited pages are not sent in response to this web access request, ISN 250 may need to maintain state information indicating that this request should not be a basis for sending unsolicited page.

From the above description, it may be noted that the present invention allows unsolicited web pages to be sent voluntarily to a user system according to the subscribed services. In addition, the requested pages are automatically sent to the user without requiring additional action from the user by a proper usage of the refresh period feature implemented with most conventional browsers.

Furthermore, by keeping the refresh period short (e.g., 2 seconds), the web pages specified by the user client software may be provided quickly while the user potentially watches the information received in the unsolicited page. The details of operation and implementation of an embodiment of ISN 250 are described below with reference to some examples.

6. Internet Service Node (ISN)

From the above, it may be appreciated that ISN 250 needs the ability to be configured with the information on the various subscribed services for each user. In general, the services may be specified as users and associated conditions. Once configured, ISN 250 may need to monitor the data flows to and from user systems to determine the flow related to the specific users. Based on such monitoring, ISN 250 may determine whether the conditions associated with the users are satisfied. ISN 250 may then forward the web access request to web server 260, which generates the appropriate web pages according to user profiles and service subscriptions.

Only the details of an embodiment of ISN 250 as may be applicable to the present invention are described here. In this embodiment, each user may be treated as a subscriber having a desired set of service policies, and processing rules implementing these policies may be generated for each user. The service requirement with reference to receiving unsolicited web pages may be viewed as a service policy. For a detailed description of some embodiments of ISN 250, the reader is referred to RELATED APPLICATION 1.

Figure 6:
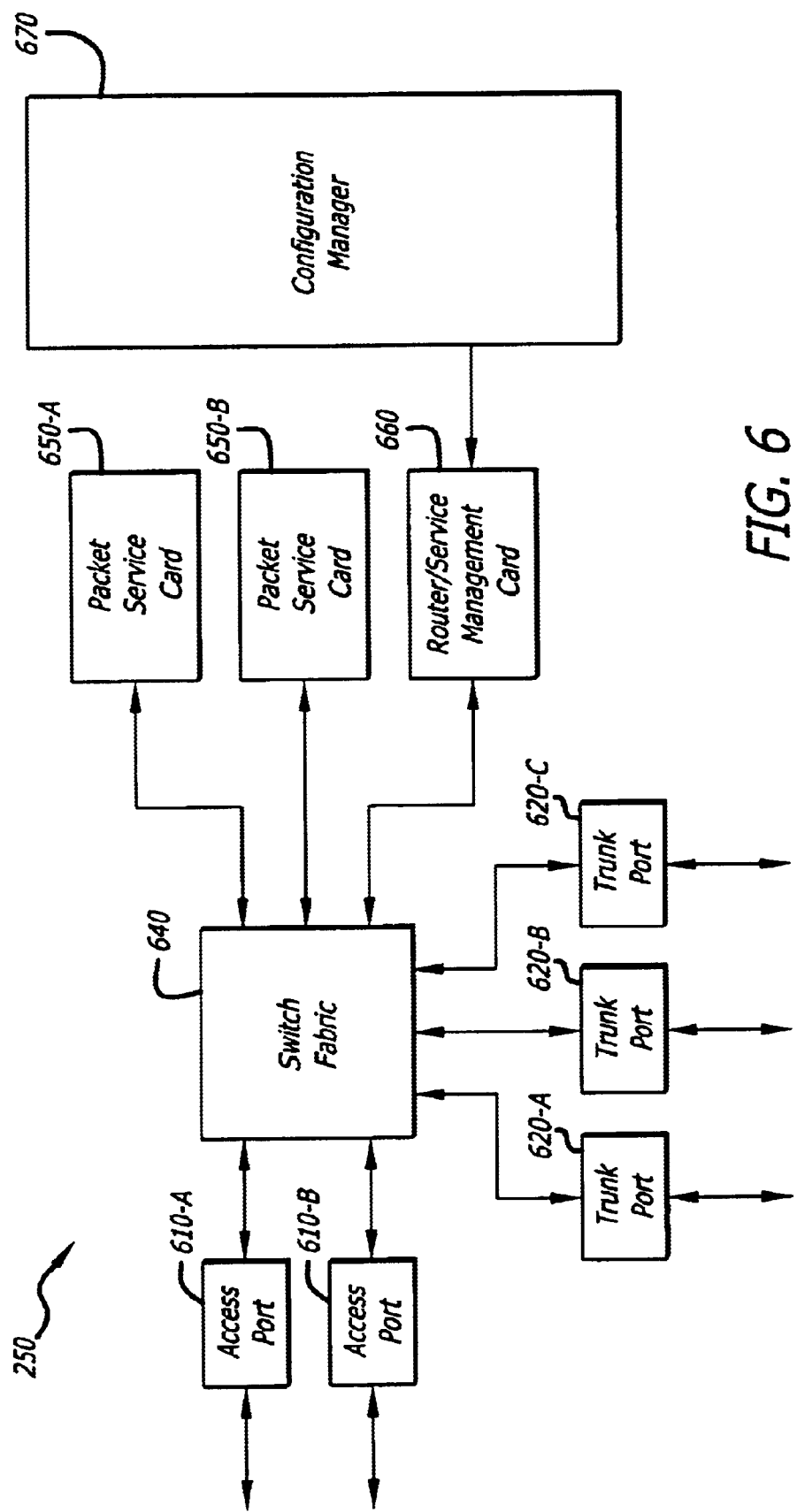
FIG. 6 is a block diagram illustrating an example implementation of an internet service node (ISN) according to the present invention.

FIG. 6 is a block diagram illustrating the details of ISN 250 in one embodiment. ISN 250 may include access ports (610-A and 610-B), trunk ports (620-A, 620-B and 620-C), switch fabric 640, packet service cards 650-A and 650-B, route/service management card (RMC) 660 and configuration manager 670. Trunk ports 620-A, 620-B and 620-C will be collectively or individually referred to by 620 as will be clear from the context. Similar convention is used with reference to other components described in the present application.

Access ports 610 provide the necessary physical interface to receive and send cells in a pre-specified format. Protocols such as Sonet may be used for high speed interface. For purposes of illustration, access ports 610 will be assumed to send and receive data in the form. of ATM cells. Each subscriber port 610 forwards the ATM cells to switch fabric 640.

Trunk ports 620 provide high speed access lines for internet access to subscribers. Trunk ports 620 may receive ATM cells from switch fabric 640, and forward the cells on the corresponding lines as specified by the channel identifier (or other destination address). Similarly, access ports 610 may receive ATM cells or IP packets from the Internet and send the cell data to switch fabric 640. In an embodiment, multiple ports are provided on a line card and each port can be configured either as a trunk port or access port. The line cards can support different access technologies such as frame relay, ATM, packet over Sonet, Fast Ethernet, Gigabit Ethernet.

Switch fabric 640 receives cells from access ports 610 and trunk ports 620, and forwards the cells to one of the packet service cards 650. Switch fabric 640 may forward the received cells to one of the packet service cards 650 upon receiving the data for an entire packet. Switch fabric 640 may use a high speed random access memory (not shown in the diagrams) for buffering the cells while awaiting the arrival of the last cell. The last cell for a packet may be determined according to AAL5 protocol well known in the relevant arts. Thus, all the cells forming a frame may be sent to an appropriate packet service card 650 once the data for a packet is available.

In an embodiment (described in further detail in RELATED APPLICATION 2), access ports 610 and trunk ports 620 may modify the cell headers to specify to which specific packet service card each cell needs to be forwarded. Switch fabric 640 may examine the cell headers and forward the packet to the specified packet service card 650.

Switch fabric 640 may receive packets from packet service cards 650, and send the received packets on one of the trunk ports 620. The specific trunk port 620 may be determined by associating a specific trunk line card 620 for each channel, which may also be identified by a channel identifier provided by packet service cards 650. Switch fabric 640 may convert the packets into cells prior to transmission on trunk line card 620.

Configuration manager 670 enables different components of ISN 250 to be configured to provide different features of the present invention. Configuration manager 670 may be implemented to communicate various configuration parameters to RMC 660, and RMC 660 may in turn configure the different components. As applicable to the present invention, an access provider (or a user by a suitable interface) may indicate whether a user wishes to receive unsolicited web pages, and the conditions (home page, times, types of information) under which the web pages may be received. n an embodiment, configuration manager 670 is implemented as a separate computer system, which interacts with ISN 250 according to a pre-specified protocol. In an alternative embodiment, configuration manager 670 may be integrated into ISN 250.

Route/service management card (RMC) 660 executes routing protocols such as Open Shortest Path First (OSPF), RIP, or BGP to determine the next hop (or forwarding information in general) for each IP packet. The routing protocols can be executed in known way. RMC 660 may provide forwarding information in the form of VCI/VPI information to identify the next hop of the IP packet.

In addition, RMC 660 may configure different components of ISN 670. For example, when a user dials-in to remote access network 290, RMC 660 may determine a specific packet service card 650 for processing data related to the user, and configure the corresponding packet service card with the relevant processing rules. RMC 660 may interface with configuration manager 670 to determine the necessary information. In addition, to ensure that switch fabric 640 forwards data related to this user to the corresponding packet service card, RMC 660 may configure trunk ports 620 and access ports 610 to modify the cell header accordingly. Configuration manager 670 may interface with web server 260 to indicate the service requirements of different users.

Packet service cards 650 may together include one or more processors to process data related to several users to provide the features in accordance with the present invention. In general, packet service cards 650 may need to be configured with (or otherwise have access to) information indicating whether a user can be sent unsolicited pages and under what conditions they can be sent. The processors may then need to examine the data from the users to determine whether the conditions associated with the users are satisfied, and the corresponding pages may be sent. An embodiment of packet service card 650 is described below in further detail.

7. Packet Service Cards

Figure 7:
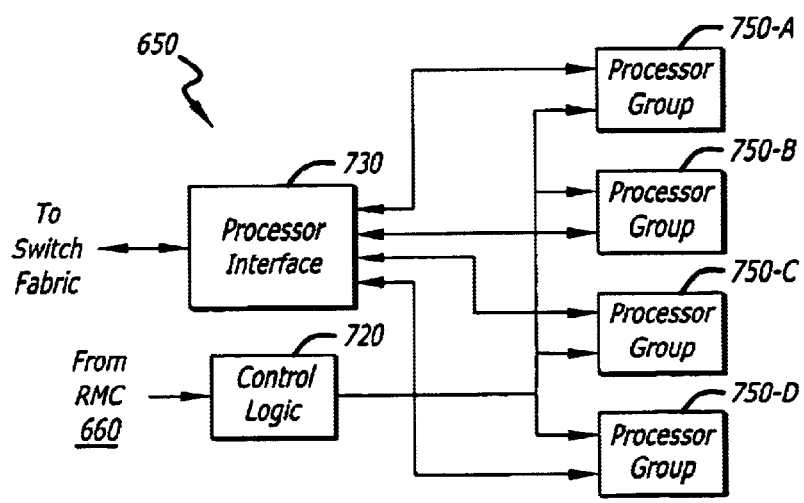
FIG. 7 is a block diagram illustrating how multiple processors can be implemented to scale to large and complex environments.

FIG. 7 is a block diagram illustrating the details of an embodiment of packet service card 650. Packet service card 650 may contain four processor groups (750-A through 750D), processor interface (PIF) 730, and control logic 720. The manner in which each block may operate is described below in further detail.

In an embodiment described here and in further detail in RELATED APPLICATION 1, each subscriber may be provided a separate set of processing rules to provide a custom set of services to each subscriber. In such an embodiment, the service requirements corresponding to each user may also be specified as one or more processing rules. However, it should be understood that different mechanisms can be implemented in ISN 250 to provide the features according to the present invention. Such other mechanisms are contemplated to be within the scope and spirit of the present invention.

Processor interface (PIF) 730 receives cells from switch fabric 640 and forwards the received cells to one of the four processor groups 750-A through 750-D. The specific processor group 750 may be specified by switch fabric 640 according to the cell header. PIF 730 further receives cells from each processor group 750 and forwards the received cells to switch fabric 640.

Each processor group 750 may contain multiple (four in an embodiment) processors and a high-speed shared memory. The memory may be used for buffering packets (cells) while being processed. Control logic 720 may determine which of the processors in a processor group may process a packet stored in the memory. In an embodiment, packets are assigned on a round robin basis among the four processors. All the four processors may be capable of processing data for the assigned users by sharing the necessary information.

Each user (or subscriber) may be uniquely assigned to a single processor group 750 and each processor group 750 may be configured with the data representing the service requirements of all the assigned users. Each processor group 750 may perform steps 340, 360 and 380 of FIG. 3 by monitoring the data related to each assigned user. The manner in which these steps of FIG. 3 and the methods of FIGS. 4 and 5 can be implemented will be apparent to one skilled in the arts based on the description provided herein.

Figure 4:
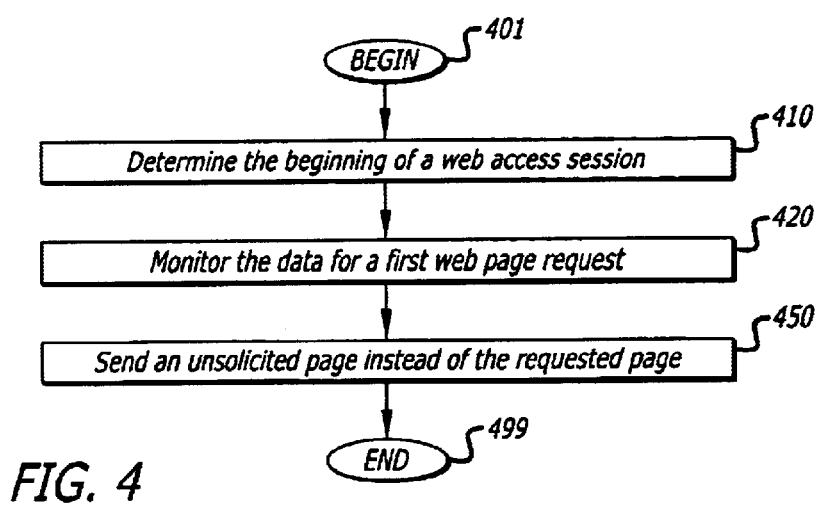
FIG. 4 is a flow-chart illustrating the manner in which the home page of a user can be controlled in accordance with the present invention.

Thus, at least by executing the steps of FIGS. 3, 4, and 5, each processor group 750 may provide unsolicited web pages in accordance with the present invention. The unsolicited web pages may be sent as a substitute for a requested page (e.g., FIG. 4), or in lieu of a requested page with the appropriate refresh period (e.g., FIG. 5).

Processor group 750 may need to maintain state information for each user to provide some or more features in accordance with the present invention. For example, if a substitute page is being provided as a home page, processor group 750 may need to store data reflecting whether a 'first page' has been already requested by the user. As noted above, for dial-in type users, the first page is generally the first web page request after the dial-in session is established. Similarly, if unsolicited web pages are being provided periodically, data representing the time duration lapsed since a previous unsolicited web page has been sent may also be maintained for the corresponding user.

Processor group 750 may generate the necessary data to indicate to web server 260 the satisfaction of a condition for a user. In response, web server 260 may generate the necessary unsolicited web page. The web pages are generated in the form of IP packets and then sent to the corresponding user. Processor group 750 may perform the switching or routing functions for these packets while being send to the user.

For each packet, processor group 750 may determine the next hop for the packet based on the routing information provided by route management card 660 or the cell header associated with the incoming cells. A new VCI/VPI number is generated according to the next hop for all the cells to be generated from the processed packet. Processor group 750 sends the cells with the new VCI/VPI number to switch fabric 640 for forwarding on appropriate trunk port 620 or access port 610.

Thus, the embodiments of FIGS. 6 and 7 generally provide different features of the present invention with each user being treated as a subscriber, with each subscriber having a specific set of subscriber rules corresponding to desired services. However, it should be understood that the present invention can be implemented in several other types of environments as will be apparent to one skilled in the relevant arts based on the disclosure herein. For example, the present invention can be implemented without necessarily having a custom set of processing rules for each of the users. In addition, the present invention can be implemented without having to use multiple packet service cards or multiple processors within each packet service card.

8. Enhancements

While the above embodiments are described to sending unsolicited web pages only in response to requests for other web pages, an aspect of the present invention enables unsolicited web pages to be sent without even receiving requests for web pages. For example, when a user successfully dials-in to a service provider network, ISN 250 may determine that the user has logged on, and immediately send an involuntary web page.

Thus, when a user agreeing to receive unsolicited web pages dials-in to access network 290, an unsolicited web page (perhaps containing targeted advertisements) is sent to the user. In contrast, if the user does not wish to receive unsolicited web page, only the requested web page access requests are sent.

As the involuntary page may be sent as the 'home page', the feature is particularly suited for ISPs who wish to send advertisements to users. In addition, as the home page is sent only to those users who have subscribed to advertisements, the service provider may flexibly send advertisements only to user wishing to receive the advertisements. Furthermore, as the same equipment (ISN 250) may be used to serve both types of subscribers (wishing to receive unsolicited web pages and not to receive the web pages), the access service may be provided cost-effectively.

9. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of serving web page access requests from a user, the method comprising:

(a) configuring an access network by specifying a combination of conditions and unsolicited web pages that are sent if said conditions are satisfied, one of said conditions comprises indicating whether an unsolicited web page can be sent as a home page of said user;

(b) receiving a web page access request from said user, said web page access request specifies a web page indicated by said user;

(c) determining whether said web page access request is a first access request in a web access session; and (d) sending said unsolicited web page if said web page access request is said first access request in said web access session, said unsolicited web page being different from said web page specified in said web page access request.

2. The method of claim 1, wherein (a)–(c) are performed in an internet service node (ISN) provided as an edge device such that said ISN is in the path of virtual connections provided to users of said access network.

3. The method of claim 1, wherein (a) comprises specifying a combination of conditions and corresponding web pages for said user, wherein a corresponding web page is sent as an unsolicited page if said ISN determines that said condition is satisfied.

4. The method of claim 1, wherein said unsolicited web page identifies a web page provided by a portal company, whereby said access provider may provide said web page provided by said portal company as a home page for said user.

5. The method of claim 1, wherein said user accesses said access network by a dial-up connection, and wherein step (d) comprises the steps of:

(f) determining whether said dial-up connection has been established; and (g) examining the data received from said user to determine the first web page access request received from said user after said dial-up connection has been established.

6. The method of claim 1, wherein said user accesses said access network by a permanent connection, and wherein step (d) comprises the steps of:

(h) configuring said ISN to indicate an idle duration which can be construed as an end of session, wherein said idle duration is associated with said user;

(i) examining the data received from said user to determine if data transfer is absent on said permanent connection for said idle duration; and (j) determining the first web access request received after the absence of data transfer for said idle duration as a request for said home page.

7. A method of serving web page access requests from a user, the method comprising:

(a) configuring an access network indicating whether unsolicited web pages can be sent to said user;

(b) receiving a web page access request from said user, said web page access request specifies a web page indicated by said user; and (c) sending an unsolicited web page in response to reception of said web page access request if the access network is configured so that unsolicited web pages can be sent to said user, said unsolicited web page is different from said web page specified by said web page access request and comprises a uniform resource locator (URL) of said web page indicated by said user, said unsolicited web page further comprises an automatic refresh period such that a user system used by said user automatically sends said web page access request again.

8. The method of claim 7, further comprising maintaining state information in said ISN to indicate that said unsolicited web page should not be sent in response to said web page access request received again by ISN.

9. An internet service node (ISN) enabling flexible provision of unsolicited web pages, said ISN comprising:

an access port for receiving a request for a web page from a user; and a packet service card that comprises a plurality of processors, a processor of said plurality of processors having access to data indicating whether unsolicited web pages can be sent to said user, said processor receiving said request for said web page from said access port and causing a web server to send an unsolicited web page in response to said request, wherein said unsolicited web page is different from web page specified by said request, whereby said ISN enables unsolicited web pages to be sent only to users agreeing to receive unsolicited web pages.

10. The ISN of claim 9, wherein said data further indicates a plurality of conditions and wherein a type of unsolicited web page is associated with each of said plurality of conditions, said processor monitoring data related to said user to determine whether said condition is satisfied, wherein said web server sends an associated type of unsolicited web page in response to the satisfaction of said condition.

11. The ISN of claim 10, wherein one of said plurality of conditions comprises receiving a first request for a web page in a user session, wherein said processor determines that said request received on said access port from said user comprises said first request and causes an unsolicited home page to be sent in response to said first request.

12. The ISN of claim 11, wherein said user session comprises a dial-up session, said processor being designed to monitor data related to said user to determine that said dial-up session is being established.

13. The ISN of claim 12, wherein said processor maintains state information indicating whether any requests for web pages have been received on said dial-up session, wherein said state information enables said processor to send said unsolicited home page in response to said first request only.

14. An internet service node (ISN) enabling flexible provision of unsolicited web pages, said ISN comprising:

an access port to receive a request for a web page from a user; and a processor having access to data stored within the ISN to indicate whether unsolicited web pages can be sent to said user, said processor to receive said request for said web page from said access port and to cause a web server to send an unsolicited web page in response to said request, said unsolicited web page being different from said web page specified by said request, one of said types of unsolicited web pages comprises a voluntary web page, being sent in response to receiving said request for said web page from said user, said voluntary web page is sent with a URL corresponding to said requested web page and a refresh period is included with said voluntary web page, said refresh period causes another request for said web page to be generated from client software used by said user.

15. The ISN of claim 14, wherein a web server generates said voluntary web page.

16. The ISN of claim 14, wherein said processor is designed to maintain state information indicating that said voluntary web page has been sent in response to said request from said user, wherein said state information enables said processor not to resend another voluntary web page in response to receiving said another request.

17. An internet service node (ISN) enabling flexible provision of unsolicited web pages, said ISN comprising:

an access port enabling a user to dial-in; and a processor having access to data indicating whether unsolicited web pages can be sent to said user upon dial-in, said processor sending an unsolicited web page to said user only if said user has agreed to receive unsolicited web pages, said processor being provided in a packet service card that comprises a plurality of processors, whereby said ISN enables unsolicited web pages to be sent only to users agreeing to receive unsolicited web pages.

\* \* \* \* \*